United States Patent Office 3,660,308
Patented May 2, 1972

3,660,308
IN SITU REGENERATION AND RESULFIDING OF A PLATINUM- AND SULFUR-CONTAINING CATALYST IN A HYDROCARBON CONVERSION PLANT CONTAINING METALLIC SULFIDE SCALE
John C. Hayes, Palatine, Ill., assignor to Universal Oil Products Company, Des Plaines, Ill.
No Drawing. Continuation-in-part of application Ser. No. 663,988, Aug. 29, 1967. This application Mar. 12, 1970, Ser. No. 19,126
The portion of the term of the patent subsequent to Dec. 2, 1986, has been disclaimed
Int. Cl. B01j 11/02, 11/18; C10g 35/08
U.S. Cl. 252—416
8 Claims

ABSTRACT OF THE DISCLOSURE

A deactivated hydrocarbon conversion catalyst, comprising a combination of a platinum group component, a halogen component and a sulfur component with a porous carrier material, is regenerated and resulfided in situ in a hydrocarbon conversion plant that contains metallic sulfide scale by the steps of: (a) stripping sulfur from the catalyst with a hydrogen stream at conditions including a temperature of about 600–800° F., effective to remove sulfur from the catalyst while not substantially affecting the metallic sulfide scale (b) purging hydrogen from the plant (c) burning carbon from the catalyst at relatively low severity conditions, including an inlet temperature of about 650–850° F. (d) purging oxygen from the plant (e) circulating a sulfur-free hydrogen stream through the plant and into contact with the resulting oxidized catalyst at conditions including a temperature of about 600–800 F., selected to reduce the resulting oxidized catalyst without reducing the metallic sulfide scale; and thereafter (f) increasing the temperature of the circulating hydrogen stream to a level selected from the range of about 1000–1100° F. to reduce at least a part of the metallic sulfide scale to hydrogen sulfide and continuing the circulation of the resulting stream for at least one hour, thereby resulfiding the catalyst.

CROSS REFERENCES TO RELATED APPLICATIONS

This application is a continuation-in-part of my prior application entitled "Treatment of an Oxidized Platinum Metal-Containing Catalytic Composite in the Presence of Metallic Sulfide Scale" which was filed Aug. 29, 1967 and assigned Ser. No. 663,988, now abandoned.

DISCLOSURE

The subject of the present invention is an in situ regeneration procedure for a deactivated hydrocarbon conversion catalyst, comprising a combination of a platinum group component, a halogen component and a sulfur component with a porous carrier material, which catalyst has seen service in a hydrocarbon conversion process using a sulfur-containing charge stock or a sulfur additive, as a consequence of which the internal surfaces of the eqipment used in the process have accumulated significant quantities of metallic sulfide scale.

Catalytic composites, containing at least one metal of the platinum group, have attained extensive commercial utility and acceptance in industries such as the petrochemical industry, the pharmaceutical industry, the detergent industry, numerous areas of the petroleum industry, etc. These industries utilize platinum metal-containing catalytic composites for the purpose of accelerating a myriad of reactions involving conversion of hydrocarbons including hydrogenation, dehydrogenation cyclization, alkylation, hydrocracking, polymerization, isomerization, dehydrogenation, oxidation, etc. For example, a widely used petroleum process for upgrading the octane characteristic of gasoline boiling range stocks, commonly called reforming, typically uses a platinum metal-containing catalytic composite in order to promote octane-upgrading reactions such as dehydrocyclization of paraffins, dehydrogenation of naphthenes, etc. Another example is the hydroisomerization of pentane and hexanes to highly branched isomers over platinum metal-containing catalysts. Yet another example is the conversion of benzene to high purity cyclohexane over a catalyst of this type.

Regardless of the industry and/or reaction involved it is essential for commercial acceptance that the particular catalytic composite utilized exhibit a high degree of initial activity and selectivity coupled with good stability characteristics. For a long period of time it had generally been accepted in the art that sulfur and sulfur compounds were poisons for platinum metal-containing catalyst and the presence of sulfur could destroy the unique activity, selectivity and stability characteristics of these catalysts. In harmony with this philosophy, extensive treating facilities were constructed and are in present day use for the purpose of eliminating, among other things, these allegedly detrimental sulfur compounds from the hydrocarbon charge stocks which are to be processed in conversion processes employing such a catalyst. Recently, however, a growing body of evidence is accumulating to the effect that sulfur and/or sulfur compounds are not as detrimental as originally suspected. And even more surprisingly in some cases they may actually be beneficial to the operation of such a process. A case in point is a low pressure reforming operation in which it has recently been discovered that the presence of controlled quantities of hydrogen sulfide can be utilized to effect a substantial reduction in the rate of deposition of carbonaceous materials with corresponding increase in the stability of the process. Likewise, in hydrocracking processes employing this type of catalyst there is some evidence to support the hypothesis that sulfur is not harmful to a platinum metal catalyst used therein. Accordingly, in many of these processes sulfur is now being deliberately added or injected into the hydrocarbon conversion zone for a number of diverse reasons associated with yield advantages, suppression of carbon formation, reaction control during start-up operations, promotion of desired reaction, etc. Irrespective of why the sulfur is present or of what the precise effects of sulfur are, or of what reactions are involved in the process, it is clear that after extended periods of use the platinum metal-containing catalyst so employed, inevitably becomes deactivated, thereby losing the capability to function as desired.

This deactivation of platinum metal-containing catalytic composite used in sulfur service is seldom sudden and most often occurs through a gradual decline in activity. In general, deactivation may be caused by one or more adverse effects. These effects may in turn result from substances which are peculiar to the particular catalyst, or which result in a change in the physical state of the components of the catalyst, or which result in a loss of these components. Catalyst deactivation may also result from the deposition of impurities which typically cover the catalytically active sites thereby shielding them from the material being processed. Generally, the principal cause of deactivation in hydrocarbon conversion processes employing a platinum metal-containing catalyst, is the deposition of coke and other carbonaceous materials on the surface of the catalyst. Not unexpectedly, hydrocarbon conversion processes employing sulfur as an additive or reactant, deactivate in a similar fashion-namely, deposition of carbonaceous material. However, despite similar deactivation characteristics, the reactivation problems encountered when sulfur has been employed differ markedly from the conventional reactivation situation in that sulfur tends to accumulate both on the catalyst and in the plant hardware, both of which can be, as is well-known, substantial sources of sulfur during a subsequent catalyst regeneration operation.

The conception of the present invention resulted from my investigation into this problem of in situ regeneration of a catalyst containing a platinum group component which is exposed to sulfur during use and which is employed in a hydrocarbon conversion plant having equipment and components fabricated out of steel alloys which in the presence of sulfur at hydrocarbon conversion conditions produce a metallic sulfide scale which generally is primarily iron sulfide. One result of this investigation was the observation that this deactivated catalyst could not be readily regenerated in situ. Specifically, when an attempt was made to reactivate these catalysts in situ using one of the conventional carbon-burning procedures of the prior art followed by a conventional reduction step with hydrogen, it was found that the catalyst typically does not respond to this treatment and permanent deactivation commonly occurs. In connection with the operation of a low pressure reforming process, I have previously observed that a sharply superior operation is obtained in the process when operated with sulfur inclusion and water exclusion. In addition, I have observed that a superior reforming catalyst for low pressure reforming is obtained if the oxidized catalyst is reduced in the substantial absence of sulfur and sulfur-containing compounds—particularly, hydrogen sulfide.

Based on these observations, I have determined that the problem of in situ regeneration of these platinum-containing catalysts, when they are used in processes where they are exposed to sulfur, is caused by the simultaneous presence of hydrogen sulfide and water under reduction conditions. In other words, the metallic sulfide scale present in the conversion plant is acting as a source for hydrogen sulfide during the reduction step. The resulting hydrogen sulfide acts, I believe, in conjunction with the water evolved from the reduction reaction of the oxidized platinum metal to detrimentally affect the catalyst. Without the intention of being limited by this explanation, it appears that the simultaneous presence of even small amounts of water and hydrogen sulfide during the reduction of an oxidized platinum group metal-containing catalyst is sufficient at elevated temperatures to cause an agglomeration reaction in this catalyst which transforms highly dispersed small platinum group metal crystallites into much larger, much less dispersed crystallites having substantially reduced activity for hydrocarbon conversion reactions. Accordingly, a simple solution to this regeneration problem would appear to involve the exclusion of the source of hydrogen sulfide from the catalyst environment during the redutcion operation. For example, a possible reactivation procedure would involve removing the catalyst from the process equipment coupled with hydrogen stripping of the sulfur from the catalyst, followed by an oxygen treatment and a hydrogen treatment. Unfortunately, for a number of reasons associated with economic factors, downtime problems, catalyst handling dangers, etc., it is usually preferred to perform reactivation in situ.

Now I have found a procedure for performing the catalyst reactivation in the sulfided hydrocarbon conversion equipment. Moreover, I have discovered how to use metallic sulfide scale present in these hydrocarbon conversion plants to aid in the conditioning of the catalyst— that is to say, my procedure utilized this metallic sulfide scale in a beneficial fashion. This last feature of the instant regeneration procedure is in sharp contract with the general teachings of prior art that the presence of this metallic sulfide scale during the regeneration procedure is detrimental.

Essential to the understanding of the regeneration procedure of the present invention is a distinction between the sulfur present in the hydrocarbon conversion system as metallic sulfide scale on the walls of the reactors, heaters, coolers and in the associated piping and equipment and the sulfur present as a component of the platinum metal-containing catalytic composite. Considering the nature of the metallurgy generally employed in hydrocarbon conversion plants utilizing hydrogen at high temperatures and pressures, I have determined that these alloys have a much higher affinity for sulfur than the platinum metal-containing catalytic composites used therein. Accordingly, the conditions necessary to effect desulfurization of these materials are markedly different, and allow the selection of conditions to effect the chemistry of the catalyst without substantially affecting or changing the metallic sulfide scale. Furthermore, I have discerned that the essential condition allowing this independent treatment is temperature. Viewed in accordance with this distinction, the present invention essentially involves critical temperature control during a platinum metal-containing catalyst in situ regeneration procedure in order to avoid the adverse effects of the uncontrolled presence of hydrogen sulfide.

It is, therefore, an object of the present invention to provide a method for reactivating in situ a platinum metal-containing catalytic composite that has seen service in a hydrocarbon conversion process employing hydrogen and sulfur whereby sulfur has been incorporated in not only the catalyst but also in the metallic equipment used in the process. Another object is to provide an in situ regeneration procedure for a catalyst containing a platinum group component, a halogen component and a sulfur component, which procedure can be used in a hydrocarbon conversion plant containing metallic sulfide scale and which procedure can beneficially utilize this metallic sulfide scale to effectively resulfide the regenerated catalyst.

In brief summary, one embodiment of the present invention involves a method for in-situ regeneration and for simultaneous resulfiding of a deactivated hydrocarbon conversion catalyst comprising a combination of a platinum group component, a halogen component and a sulfur component with a porous carrier material. The catalyst has been deactivated by the deposition of carbonaceous materials thereon during a previous contacting with a sulfur-containing hydrocarbon charge stock at hydrocarbon conversion conditions. Moreover, the catalyst is located in a conversion zone of a hydrocarbon conversion plant which has its internal surfaces coated with a metallic sulfide scale. Against this background, the present method in this embodiment comprises the following sequence of steps: (a) circulating a substantially sulfur-free hydrogen stream through the plant and into contact with the deactivated catalyst at conditions, including a temperature of about 600° F. to about 800° F., selected to effect the removal of a substantial portion of the sulfur component from the catalyst without substantially reducing the metallic sulfide scale, said contacting being conducted until the effluent gas stream from the conversion zone is substantially free of hydrogen sulfide; (b) purging hydrogen from the plant; (c) circulating an oxygen-containing stream through the plant and into contact with the resulting substantially sulfur-free catalyst at carbon-burning conditions, including an inlet temperature to the conversion zone of about 650 to about 850° F., for a period sufficient to substantially remove said carbonaceous materials and to oxidize at least a part of the platinum group component of the catalyst; (d) purging oxygen from the plant; (e) circulating a substantially sulfur-free hydrogen stream through the plant and into contact with the resulting oxidized catalyst at conditions, including a temperature of about 600° to about 800° F. selected to effect the reduction of the oxidized platinum group component contained in the catalyst without reducing the metallic sulfide scale contained in the hydrogen conversion plant; and thereafter: (f) treating the catalyst from step (e) by circulating a substantially water-free hydrogen stream through the plant and into contact with the catalyst at conditions including a temperature of about 1,000 to about 1,100° F. selected to effect reduction of at least a part of said metallic sulfide scale to hydrogen sulfide and continuing the circulation of the resulting H₂S containing hydrogen stream for at least 1 hour, thereby simultaneously effecting the resulfiding of the catalyst.

Other objects and embodiments of the present invention encompass further details about the catalysts that can be regenerated thereby, the conditions and reagents used in each step of the regeneration method, the characteristics of the metallic sulfide scale of concern here and the mechanics associated with each of the steps of the regeneration procedure. These objects and embodiments are hereinafter disclosed in the following detailed description of each of the essential and preferred steps of the present invention.

As hereinbefore set forth, the present invention encompasses a regeneration procedure for a catalyst containing a platinum group component. Although the treatment procedure of the present invention is specifically directed to the use of a catalyst containing platinum, it is intended to include other platinum metals such as palladium, rhodium, ruthenium, etc. Generally, the amount of the metallic component combined with the catalyst is small compared to the quantities of other components combined therewith. For example, platinum and/or palladium or other metals from the platinum group will generally comprise from about 0.01 to about 3 wt. percent of the catalyst, calculated on an elemental basis, and usually from about 0.1 to about 2 wt. percent.

Whatever the metallic component, it is generally combined with a porous carrier material. Typically, the porous carrier material is a highly refractory inorganic oxide such as alumina, silica, zirconia, magnesia, boria, thoria, titania stronia, etc., and mixtures of two or more including silica-alumina, alumina-boria, silica-alumina-zirconia, etc. These refractory inorganic oxides may be manufactured by any suitable method including separate, successive, or coprecipitation methods of manufacture, or they may be naturally-occurring substances such as clays, or earths which may or may not be purified or activated with special treatment.

The preferred refractory inorganic oxide for the catalysts regenerated in the present invention is alumina, either in admixture with any of the aforementioned refractory oxides, or as the sole component of the refractory material selected to serve as the carrier or support for the platinum group component. In the present specification and appended claims, the term "alumina" is employed to mean porous aluminum oxide in all states of oxidation and in all states of hydration, as well as aluminum hydroxide. The alumina may be synthetically prepared or naturally occurring, and it may be of the crystalline or gel type. Whatever type of alumina is employed, it may be activated prior to use by one or more treatments including drying, calcining, steaming, etc. It may be in a form known as activated alumina, activated alumina of commerce, porous alumina, alumina gel, etc. In many cases, the catalyst regenerated by the instant method will use gamma-alumina as a carrier material.

The catalyst regenerated by the instant method also typically contains combined halogen. This combined halogen may be either fluorine, chlorine, iodine, bromine, or mixtures thereof. Of these, fluorine and chlorine are preferred because of their superior compositing characteristics and their ready availability. The halogen may be added to the calcined carrier material in any suitable manner, and either before, during, or after the addition of the platinum group component. The halogen may be added in an impregnation step by contacting the carrier material with an aqueous solution of an acid, such as hydrogen fluoride, hydrogen chloride, hydrogen bromide, etc., or with an aqueous solution of a soluble decomposable salt such as ammonium fluoride, ammonium chloride, etc. At least a portion of the halogen component may be combined with the alumina during the impregnation of the latter with the platinum group component; for example, through the utilization of a mixture of chloroplatinic acid and hydrogen chloride. In any event, the halogen will be typically added in an amount sufficient to result in a final composite containing about .1 to about 1.5 wt. percent and preferably about 0.4 to about 1 wt. percent of halogen, calculated on an elemental basis.

According to the present invention, the catalyst that is regenerated thereby is located in one or more conversion zones of a hydrocarbon conversion plant having its internal surfaces coated with a metallic scale. Thus, it is located in the presence of metallic sulfide sulfide scale. By this is meant that they are in open communication: a gaseous environment contacting one of them would necessarily contact the other. This situation commonly arises in hydrocarbon conversion processes which operate on a charge stock containing sulfur or to which sulfur is added in any manner. It is well known that these hydrocarbon conversion processes use equipment components which are fabricated out of special alloys of steel which are particularly designed for service in the presence of hydrogen at elevated temperatures. These special alloys are necessary because at high temperatures and pressures molecular hydrogen disassociates into atomic hydrogen which can enter common carbon steel and cause permanent damage such as internal fissuring, cracking, blistering, etc. To avoid this problem, the art commonly fabricates the components of these hydrocarbon conversion plants out of special alloys resistant to hydrogen attack. Typical examples of these special alloys are: general purpose stainless steels containing about 10% to 25% chromium, austenitic stainless steels containing at least 16% chromium and at least 7% nickel, martensitic stainless steels etc. Accordingly, reactor systems, heaters, coolers and associated pumps, piping systems, etc., for hydrogen service are commonly fabricated out of alloys of metals selected from the group consisting of iron, nickel, cobalt, manganese, chromium, molybdenum, vanadium, and tungsten. And when these equipment components are exposed to sulfur during use, a metallic sulfide scale forms on the surface exposed to the sulfur. And it is precisely the presence of this metallic sulfide scale that can cause the deactivation problems, referred to hereinbefore, during subsequent in situ catalyst regeneration. Generally, this metallic sulfide scale is primarily iron sulfide.

In these hydrocarbon conversion plants, a hydrocarbon charge stock and hydrogen are charged to a conversion zone containing the catalyst at reaction conditions appropriate for the particular hydrocarbon conversion reactions of interest. Moreover, for the class of conversion systems included within the scope of the present invention, sulfur or a sulfur-containing compound is also charged to the conversion zone containing the catalyst. The sulfur may be present in the hydrocarbon charge stock or the hydrogen stream or both of these or added independently of both of these. For example, a common procedure is to commingle a sulfur-containing compound such a tertiary butyl mercaptan, with the hydrocarbon charge stock at levels of about 10 p.p.m. up to about 5000 p.p.m. or more. In another case, the hydrocarbon charge stock may inherently contain sufficient sulfur and it is merely a question of leaving the sulfur in the feed stock before processing it. In any event, the sulfur is present in the hydrocarbon conversion zoned during the actual process, and as a consequence the catalyst accumulates substantial amounts of sulfur or sulfur-containing compounds. In addition, as pointed out hereinbefore, the reactors and associated equipment accumulate a coating of metallic sulfide scale. This phenomenon is well known to those skilled in the art and indeed, is one of the reasons why emphasis in the prior art has been focused on the exclusion of sulfur from these processes.

As previously explained, a process operated with sulfur inclusion ordinarily experiences a gradual decline in activity of the catalyst used because of deposition of carbonaceous materials on the catalyst. These materials slowly choke off access of the reactants to the active sites of the catalyst. Consequently, the catalyst at some point in time requires either reactivation or replacement. As is pointed out hereinbefore, the present invention is directed at the situation encountered when it is desired to reactivate this deactivated catalyst in situ.

Considering the situation that develops when a platinum-containing catalyst that has been exposed to this type of service is to be reactivated in situ, it is clear from the prior art that the persence of this metallic sulfide scale can cause substantial problems. In sharp contrast with this teaching, I have now found a procedure which allows the sulfide scale to be beneficially used during the regeneration procedure. My regeneration procedure essentially comprises: a sulfur-stripping step, a carbon-burning step, a low temperature hydrogen treatment step and a subsequent high temperature hydrogen treatment step.

The initial sulfur-stripping step is designed to remove substantially all of the labile sulfur from the catalyst. This sulfur may be present in chemical combination with other components of the catalyst (e.g. as platinum sulfide) or it may be adsorbed or chemisorbed on the surface of the catalyst. Most likely, all of these sulfur acquisition modes will be activated during the hydrocarbon conversion process. In any event, the sulfur is generally present in an amount of from about 0.1 to about 2 wt. percent of the catalyst or more. In accordance with the present invention, this sulfur is removed by circulating a substantially sulfur-free hydrogen stream through the hydrocarbon conversion plant containing the reactivated catalyst, at conditions, including a temperature of about 600° F. to about 800° F., selected to strip sulfur from the catalyst without affecting the metallic sulfide scale. The pressure employed in this step can range from atmospheric up to the operating pressure for the hydrocarbon conversion plant; however, it is generally preferred to operate at the pressure utilized for hydrocarbon conversion or slightly below this. Likewise, the flow rate of the hydrogen through the conversion zone is subject to a wide range of choices, but generally best results are obtained at approximately the flow rate which is utilized during the on-stream portion of the hydrocarbon conversion plant operation. The function of this sulfur-stripping step is to effect the removal of a substantial portion of the sulfur component from the catalyst without substantially affecting the metallic sulfide scale present in the plant. This step is performed for a period extending until the effluent gas stream for the zone containing the catalyst is substantially free of hydrogen sulfide: that is less than 10 vol. p.p.m., and preferably less than 1 vol. p.p.m. The hydrogen stream utilized in this step can be a once-through substantially sulfur-free stream or a recycle stream provided that, in the recycle case, suitable arrangements are made to scrub $H_2S$ from the recirculated hydrogen stream.

The resulting substantially sulfur-free catalyst is then subjected to a low temperature carbon-burning step with a relatively small amount of oxygen. Hydrogen is, of course, first purged from the hydrocarbon conversion plant either by displacement with an inert gas or by depressurizing the environment containing the catalyst down to a fraction of an atmosphere, or by any similar procedure. The carbonaceous deposits are then removed by circulating an oxygen-containing stream through the plant and into contact with the catalyst at carbon-burning conditions. Generally the oxygen-containing stream is obtained by mixing together air and an inert gas such as nitrogen in such a manner that the amount of $O_2$ is carefully controlled to insure that the temperature of the burning wave in the catalyst bed does not exceed 1000° F. This last requirement is necessary in order to avoid detrimental migrations or transformation of the platinum metal. During this step, it is essential to hold the inlet temperature to the conversion zone containing the catalyst in the range of about 650 to 850° F. in order to insure that this requirement is met. Best results are obtained with an inlet temperature of about 700 to about 800° F. The concentration of oxygen in this oxygen-containing gas stream should never exceed about 1% by volume and, within this limitation is usually adjusted to achieve a combustion temperature in the range of about 700° F. to about 1000° F. in order to achieve substantially complete carbon removal. The amount of oxygen in this last gas stream is preferably selected from about 0.3 to 1 mole percent, with best results obtained at about 0.6 mole percent. This step can be performed at any desired pressure, but atmospheric pressure is generally preferred. This step is generally continued for a period which is sufficient to substantially remove carbonaceous deposits from the catalyst. The point at which substantially complete removal of the carbonaceous deposits from the catalyst can be determined by any of the procedures known to the art. One acceptable procedure is to monitor the concentration of $O_2$ gas in the effluent gas stream from the conversion zone and terminate this step when it rises to the amount in the input gas stream. Another procedure is to monitor the $\Delta T$ across the conversion zone and terminate this step when it drops to a value less than 10° F.

After the oxidation step, at least a portion of the platinum group component of the catalyst is in an oxidized state, and in order to restore the preferred level of catalyst activity it is essential that this component be reduced. According to the present invention this reduction is accomplished in a two step operation wherein the critical parameter is temperature. Of course, the hydrocarbon conversion plant must first be purged of all free oxygen by passing an inert gas such as nitrogen therethrough or by any other known procedure. The first step of the reduction operation is then performed by passing a substantially sulfur-free hydrogen stream through the system at reduction conditions, including a temperature of about 600° F. to about 800° F. selected to reduce platinum oxide. As was pointed out previously, this temperature limitation enables the reduction of the oxidized platinum group component while simultaneously preventing the reduction of the metallic sulfide scale. This hydrogen stream can be a stream of pure hydrogen or it can be recycle hydrogen that has been suitably scrubbed down to low levels of water and sulfur by any suitable method such as by passing the effluent gas stream from the conversion zone over a suitable adsorbent—for example, high surface area sodium, aluminosilicates, alumina, silica gel, etc. This reduction step can be effected at any suitable pressure, but it is generally preferred to perform it at atmospheric pressure or slightly above. Similarly, the flow rate of the hydrogen stream through the hydrocarbon conversion plant during this step is preferably set at the same level employed during the actual operation of the process. The duration of this step should be sufficient to reduce the platinum oxide contained in the catalyst to the metallic state. Obviously, this period varies as a function of the amount of oxygen combined with the platinum metal. One acceptable method for determining when this step is complete involves monitoring the level of $H_2O$ in the effluent gas stream from the conversion zone and terminating this step when it drops to negligible levels of the order of about 5 to 10 volume p.p.m. In most cases, excellent results are obtained when the duration of this step is about 1 to about 5 hours.

Following this low temperature hydrogen treatment step, the platinum group component contained in the catalyst is substantially reduced, but because of the higher stability of the metallic sulfide scale, it is substantially unchanged by this hydrogen treatment. Consequently, the previously mentioned adverse effects of the presence of sulfur during the reduction of the oxidized platinum group component are avoided.

According to the present invention, the resulting reduced catalytic composite is thereafter subjected to a high temperature treatment step with a water-free hydrogen stream at conditions selected to reduce at least a part of the metallic sulfide scale contained in the plant. This step is conducted at a pressure of about 1 atmosphere up to the design limit for the conversion plant, with the preferred value being slightly above atmospheric pressure. Similarly, the flow rate of the hydrogen stream through the plant can vary widely; but, in general, excellent results are obtained if the hydrogen stream is circulated at about the same rate used during hydrocarbon conversion operation. Of critical significance is the temperature utilized; it must be between about 1000° F. to about 1100° F. This temperature constraint is necessary in order to reduce at least a portion of the metallic sulfide scale in the plant. Preferably, the hydrogen stream is continuously ciriculated through the plant without any attempt to scrub hydrogen sulfide therefrom. If the concentration of $H_2S$ in this circulating hydrogen stream is monitored, it is found that it slowly builds from negligibie levels (i.e. less than about 1 vol. p.p.m.) to about 100 vol. p.p.m. or more. This increase in $H_2S$ concentration is indicative not only of the reduction of the metallic sulfide scale, and also of the extent to which the catalyst has been resulfided. It is well-known that there are a number of ways to determine when the catalyst has been sufficiently sulfided (i.e. defined herein as essentially the condition when the mole ratio of platinum metal to sulfur in the catalyst is about 1:1); however, the preferred method is to allow the concentration of hydrogen sulfide in the circulating gas to build up to a constant value, thus establishing a new equilibrium condition for the $H_2S$ in the conversion plant. In general, the duration of this step is at least 1 hour, with best results obtained in about 1 to about 5 hours. The hydrocarbon conversion plant can then be restarted with the resulting reduced and sulfided catalyst.

The following examples are given to further illustrate the ramifications of the regneration method of the present invention and to indicate the benefits to be realized through the utilization thereof. It is, of course, understood that the examples are not to be construed to limit unduly the generally broad scope of the present invention.

EXAMPLE I

A laboratory scale hydrocarbon conversion system having a steel reactor fabricated out of a steel alloy, designed to resist high temperature hydrogen attack, was utilized in a reforming operation wherein it was exposed to hydrogen sulfide at high temperatures for a prolonged period. As a consequence of this exposure both the reactor and associated equipment in the plant accumulated substantial quantities of metallic sulfide scale.

During the regular shutdown at the completion of the last scheduled run in a series of tests, the system was purged with hydrogen for about 3 hours in order to eliminate the last traces of charge stock. The reactor was then cooled, unloaded, and reloaded with a 100 cc. charge of a fresh oxidized catalyst.

The catalyst was prepared utilizing 1/16 inch alumina spheres, manufactured in accordance with U.S. Pat. No. 2,620,314. These spheres were then impregnated with a solution of chloroplatinic acid and hydrogen chloride. The impregnated spheres were then subjected to a high temperature oxidation (or calcination) at a temperature of about 900° F. to 1100° F. The resultant oxidized composite contained 0.90 wt. percent chloride and 0.75 wt. percent platinum, calculated on an elemental basis.

The oxidized catalyst was then subjected to the two-step in situ hydrogen treatment of the present invention. This was accomplished by passing substantially pure hydrogen over the catalyst at a flow rate of about 3.0 s.c.f.h. and at about atmospheric pressure. The effluent gas stream from the reactor during this first step was passed to a caustic scrubber which removed $H_2S$ from the gas and provided a measure of the amount of metallic sulfide scale which is reduced during each step of the treatment.

This first step was conducted at an average temperature of 750° F. for a period of about 3 hours. At the end of this period the caustic in the scrubber was analyzed and found to contain 0.4 p.p.m. $H_2S$. The caustic in the scrubber was then replaced with a fresh solution.

The second step was thereafter performed with a substantially pure hydrogen stream at an average temperature of about 1025° F. for a period of about 3 hours. Pressure and hydrogen flow rate were the same as in the first step. At the end of this period, an analysis of the caustic solution showed that it contained 100 p.p.m. $H_2S$.

After this treatment the plant was started-up and a normal catalyst evaluation test was performed with a heavy Kuwait naphtha. No start-up difficulties were encountered and the catalyst was found to have an activity and stability comparable to those observed with a presulfided catalyst. Accordingly, this example manifests the distinct difference between the temperature required to reduce the oxidized platinum metal catalyst and that required to reduce the metallic sulfide scale that forms in a plant designed for high temperature hydrogen service. Specifically, the $H_2S$ concentration data for the two steps of the hydrogen treatment evidences the fact that substantially no metallic sulfide scale was reduced at the low temperatures whereas at the high temperature there was substantial reduction of this scale. Coupled with this result is the high activity and stability of the treated catalytic composite which indicates the avoidance of an agglomeration reaction which had heretofore produced reactivation problems.

EXAMPLE II

A catalyst similar to the one characterized in Example I is used in a laboratory scale reforming plant fabricated out of stainless steel in order to avoid high temperature hydrogen attack on the equipment. This plant is operated for a prolonged period to reform a heavy Kuwait naphtha containing 2400 p.p.m. sulfur. After processing about 50 barrels of the charge stock per pound of catalyst, the activity of the catalyst declines, because of deposition of carbonaceous materials, to the point where it must be reactivated.

Heretofore attempts at reactivating, in situ, this type of catalyst via standard oxygen-burning procedures followed by a reduction operation have been extremely difficult as is well-known to those skilled in the art.

However, reactivation according to the present invention is commenced by circulating a hydrogen stream through the plant at a temperature of about 750° F. and at a pressure of about 100 p.s.i.g. The gaseous effluent stream from the reactor is passed to an adsorption zone where it is contacted with high surface area sodium to remove $H_2S$ and $H_2O$, and the resulting purified hydrogen stream is recycled through the plant compressor to the reactor at the rate ordinarily used during reforming operations. This treatment is continued for about 5 hours until the effluent from the zone containing the catalyst is essentially free of $H_2S$ at which point the sulfur on the catalyst is determined to be about 0.03%.

Hydrogen is then purged from the plant with a nitrogen flush, and a mixture of nitrogen and oxygen containing 0.6 vol. percent oxygen is then heated to about 750° F. and passed to the reactor at a rate which maintains a temperature in the catalyst bed at about 800° F. The $O_2$ content of the effluent gas stream from the reactor is monitored and when it increases to the value in the input stream this burning step is stopped. This requires about 10 hours for this case.

The reactor is then purged with nitrogen, hydrogen is reintroduced, gas circulation established, and a low temperature hydrogen reduction step is performed at a temperature of about 750° F. and a pressure slightly above atmospheric pressure. The gaseous effluent stream from the reactor is passed to an adsorption zone, as before, and the resulting substantially sulfur-free and water-free hydrogen stream recycled to the reactor through the plant compressor. This treatment is continued for about 3 hours, at which point the H₂O content in the effluent gas from the reactor has dropped to less than 5 vol. p.p.m.

Thereafter, the temperature of the circulating hydrogen is raised to about 1050° F. Immediately, the concentration of H₂S in the gaseous effluent from the reactor starts to increase. The adsorption zone is cut-out of the recycle line, and the H₂S concentration in the recycled hydrogen stream lines-out and the treatment is stopped.

Reforming operations are restarted with this regenerated and resulfided catalyst and it is found to have an activity and stability equivalent to a similar catalyst regenerated and resulfided in a non-sulfided reactor or in a separate vessel. Thus, the detrimental effects of the metallic sulfide scale on the catalyst have been avoided.

It is intended to cover by the following claims all changes and modifications of the above disclosure of the present invention which would be self-evident to a man of ordinary skill in the catalyst regeneration art.

I claim as my invention:

1. A method for in situ regeneration and for simultaneous resulfiding of a deactivated hydrocarbon conversion catalyst comprising a combination of a platinum group component, a halogen component and a sulfur component with a porous carrier material, which catalyst has been deactivated by the deposition of carbonaceous materials during a previous contacting with a sulfur-containing hydrocarbon charge stock at hydrocarbon conversion conditions, and which catalyst is located in a conversion zone of a hydrocarbon conversion plant that has its internal surfaces coated with a metallic sulfide scale, said method comprising the steps of:

(a) circulating a substantially sulfur-free hydrogen stream through the plant and into contact with the catalyst at conditions, including a temperature of about 600 to about 800° F., selected to effect the removal of a substantial portion of the sulfur component from the catalyst without substantially reducing the metallic sulfide scale, said contacting being continued until the effluent gas stream from the conversion zone is substantially free of hydrogen sulfide;

(b) purging hydrogen from the plant;

(c) circulating an oxygen-containing stream through the plant and into contact with the resulting substantially sulfur-free catalyst at carbon-burning conditions, including an inlet temperature to the conversion zone of about 650 to about 850° F., sufficient to substantially remove said carbonaceous materials and to oxidize at least a part of the platinum group component of the catalyst;

(d) purging oxygen from the plant;

(e) circulating a substantially sulfur-free hydrogen stream through the plant and into contact with the resulting oxidized catalyst at conditions, including a temperature of about 600° F. to about 800° F., selected to effect the reduction of the oxidized platinum group component contained in the catalyst without reducing the metallic sulfide scale contained in the hydrogen conversion plant; and thereafter;

(f) treating the catalyst from step (e) by circulating a substantially water-free hydrogen stream through the plant and into contact with the catalyst at conditions, including a temperature of about 1,000 to about 1,100° F., selected to effect reduction of at least a part of said metallic sulfide scale to hydrogen sulfide and continuing the circulation of the resulting hydrogen sulfide-containing substantially, water-free hydrogen stream for at least 1 hour, thereby simultaneously effecting the resulfiding of the catalyst.

2. A regeneration method as defined in claim 1 wherein said platinum group component of the deactivated catalyst is platinum or a compound of platinum.

3. A regeneration method as defined in claim 1 wherein said halogen component of the deactivated catalyst is chlorine or a compound of chlorine.

4. A regeneration method as defined in claim 1 wherein said porous carrier material is a refractory inorganic oxide.

5. A refrigeration method as defined in claim 4 wherein said refractory inorganic oxide is alumina.

6. A regeneration method as defined in claim 1 wherein the carbon-burning conditions utilized in step (c) include an inlet temperature of about 700 to 800° F.

7. A regeneration method as defined in claim 1 wherein the amount of oxygen contained in said oxygen-containing stream utilized in step (c) is about 0.3 to about 1 mole percent thereof.

8. A regeneration method as defined in claim 1 wherein said metallic sulfide scale comprises iron sulfide.

References Cited

UNITED STATES PATENTS

| | | | |
|---|---|---|---|
| 3,481,861 | 12/1969 | Hayes | 252—416 |
| 2,853,435 | 9/1958 | Levering et al. | 252—416 |
| 2,761,819 | 9/1956 | Dinwiddie et al. | 208—65 |
| 2,856,349 | 10/1958 | Love | 252—419 |
| 3,315,007 | 4/1967 | Abell, Jr. et al. | 252—466 |
| 2,863,825 | 12/1958 | Engel | 252—466 |
| 2,870,085 | 1/1959 | Love | 252—416 |

FOREIGN PATENTS

| | | | |
|---|---|---|---|
| 744,459 | 2/1956 | Great Britain | 252—411 |

DANIEL E. WYMAN, Primary Examiner

P. E. KONOPKA, Assistant Examiner

U.S. Cl. X.R.

208—140; 252—419